Feb. 27, 1962 W. P. JENNY ETAL 3,023,359

METHOD AND APPARATUS FOR MAKING HIGH RESOLUTION FUNCTION EARTH'S MAGNETIC FIELD MAPS

Filed Jan. 2, 1959 9 Sheets-Sheet 1

William P. Jenny
Thomas A. Rabson INVENTORS

BY Murray Robinson

ATTORNEY

William P. Jenny
Thomas A. Rabson INVENTORS

BY Murray Robinson
ATTORNEY

Feb. 27, 1962 W. P. JENNY ET AL 3,023,359

METHOD AND APPARATUS FOR MAKING HIGH RESOLUTION FUNCTION EARTH'S MAGNETIC FIELD MAPS

Filed Jan. 2, 1959

9 Sheets-Sheet 3

William P. Jenny
Thomas A. Rabson INVENTORS

BY Murray Robinson

ATTORNEY

William P. Jenny
Thomas A. Rabson INVENTORS
BY Murray Robinson
ATTORNEY

Feb. 27, 1962 W. P. JENNY ETAL 3,023,359

METHOD AND APPARATUS FOR MAKING HIGH RESOLUTION FUNCTION EARTH'S MAGNETIC FIELD MAPS

Filed Jan. 2, 1959 9 Sheets-Sheet 5

William P. Jenny
Thomas A. Rabson INVENTORS

BY Murray Robinson

ATTORNEY

William P. Jenny
Thomas A. Rabson INVENTOR.
BY Murray Robinson
ATTORNEY

Feb. 27, 1962 W. P. JENNY ETAL 3,023,359

METHOD AND APPARATUS FOR MAKING HIGH RESOLUTION FUNCTION EARTH'S MAGNETIC FIELD MAPS

Filed Jan. 2, 1959 9 Sheets-Sheet 7

William P. Jenny
Thomas A. Rabson INVENTORS

BY Murray Robinson
ATTORNEY

William P. Jenny
Thomas A. Rabson INVENTORS

BY Murray Robinson
ATTORNEY

William P. Jenny
Thomas A. Rabson INVENTORS

BY Murray Robinson

ATTORNEY 3,023,359

METHOD AND APPARATUS FOR MAKING HIGH RESOLUTION FUNCTION EARTH'S MAGNETIC FIELD MAPS

William P. Jenny, Bank of The Southwest Bldg., Houston, Tex., and Thomas A. Rabson, Houston, Tex.; said Rabson assignor to said Jenny Filed Jan. 2, 1959, Ser. No. 784,730
14 Claims. (Cl. 324—4)

This invention pertains to method and apparatus for preparation of maps of high resolution functions of the earth's magnetic field, which maps are useful in the location of subterranean mineral deposits such as oil.

According to the invention, simultaneous with the usual pen records, magnetic tape records are made in aerial surveys made by flying a plurality of parallel traverses, e.g. as set forth in United States Patent 2,635,134, issued April 14, 1953, to William P. Jenny, entitled "Surface Micromagnetic Survey Method." Simultaneously a record is made of the diurnal magnetic variation of the survey area. These field versus time records are converted to field versus distance records by comparison with a map strip prepared, for example, by the method disclosed in the copending application of W. P. Jenny, Serial Number 474,199, filed December 9, 1954, entitled "Record Transformation," since abandoned in favor of continuation application Serial Number 2,138, filed January 13, 1960, also entitled "Record Transformation." The converted traverse records are then corrected for diurnal variation and fed through a suitable apparatus producing a record of the average of spaced points on the converted record, and, the resultant is again fed through the apparatus to produce a record of the average of differently spaced points, this process being repeated a number of times to produce a record herein termed the chorded record. The chorded record is compared with the original converted record to produce a record of the difference therebetween, such record being herein termed the chord-difference record. The chord-difference records from the several traverses are transcribed by pen one above the other on paper, the base lines of the several records being spaced apart equal to the distances between the several traverses to the same scale as the distance in the chord-difference records. The resultant profile map is then interpreted to indicate subterranean structures, for example, as disclosed in the copending application of W. P. Jenny, Serial Number 534,840, filed September 16, 1955, entitled "Magnetogram Analysis."

Advantages of the invention are speed, accuracy, and uniformity of results as compared with manual methods of attempting to reach the same result.

For a detailed description of a preferred embodiment of the invention, reference will now be made to the accompanying drawings wherein:

FIGURES 6 through 10 are to be combined into a single circuit diagram.

Figure 1:
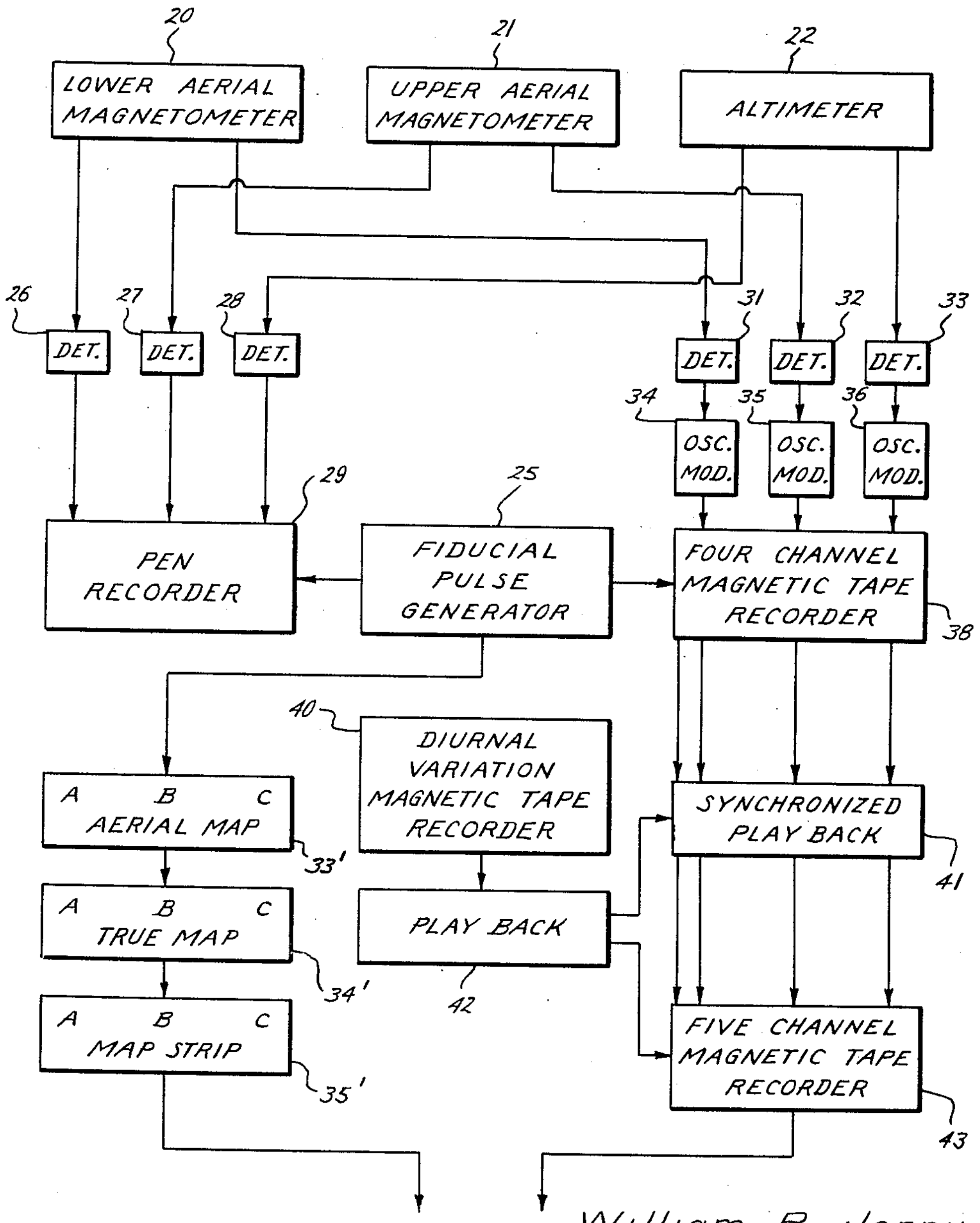
FIGURE 1 is a schematic drawing illustrating the data recording portion of the invention.

Referring now to FIGURE 1 there is shown schematically a pair of magnetometers 20, 21. These are to be airborne as disclosed in the aforementioned United States Patent No. 2,635,134, the magnetometers being carried at different levels during the flight. For example magnetometer 20 may be the lowermost and magnetometer 21 uppermost. The outputs of these magnetometers, which are of the fluxgate type, will be alternating current amplitude modulated proportional to the variation of the earth's magnetic field intensity over the traverse flown by the aircraft.

An altimeter 22 having an alternating current output amplitude modulated proportional to the atmospheric pressure is carried by the same airplane that makes the aerial magnetic survey, to give evidence of the maintenance of constant altitude during the flight.

A pulse generator 25 controlled by a clock generates electric pulses at regular intervals of twenty-four seconds corresponding roughly to one mile of travel of the aircraft.

The alternating current outputs of the two magnetometers and the altimeter, which usually will have a frequency of 400 cycles per second, are fed to detectors 26, 27, 28 and the demodulated outputs of the detectors are fed to a pen recorder 29 together with the output of generator 25. There is thus produced a visual record of the magnetic fields measured by the two magnetometers and the altitude as measured by the barometer with a time scale determined by the fiducial markings caused by the pulse generator.

The outputs of the magnetometers and altimeter are also fed to detectors 31, 32, 33 which feed into oscillators 34, 35, 36 to modulate the outputs of the oscillators, the oscillators' frequency being selected as one most suitable for magnetic tape recording. If the magnetometer and altimeter output frequency is suitable for such recording and if the frequency and voltage thereof are sufficiently stable, the detectors and oscillators 31–36 may be omitted. Whether fed direct or after conversion of the carrier frequency, the magnetometer and altimeter outputs are fed-along with the output from pulse generator 25 to four channel magnetic tape recorder 38.

During each flight with the magnetometers, aerial photographs 33' are taken with a camera. The photography may be continuous with fiducial markings of equal time intervals thereon produced in response to the output of pulse generator 25, or else the camera may take successive pictures at intervals whenever triggered by a pulse from generator 25. In either case a record is obtained of the terrain over which the aircraft is flying at the time of each pulse whereby these equal time spaced positions of the aircraft can subsequently be determined and marked on a true distance scale map 34'. The letters A, B, C indicate the corresponding points on the photograph 33' and map 34'. By placing a strip of plain paper alongside map 34' and marking at intervals A, B, C, etc., equal to the intervals between the points A, B, C on the map, the resultant marked paper strip 35' being called herein a map strip or control tape.

During the flight with the magnetometers there is a magnetic tape recorder 40 on the ground in the vicinity of the flight to record the magnetic field at a fixed location, time being indicated on the record so that it can be synchronized with the four channel tape from recorder 38. The tape from recorder 38 is fed through playback reproducer 41 simultaneously with the tape from recorder 40 being fed through playback reproducer 42. The outputs of reproducers 41, 42 are fed to five channel magnetic tape recorder 43 on which a synchronized record 49 (see FIG. 2) is thus made of the airborne magnetometer measurements, the altitude, and the diurnal variation of the earth's magnetic field.

It may be mentioned here that in order to accurately record small intensity variations as superimposed on large regional magnetic anomalies provision can be made where necessary to introduce step discontinuities in the magnetic recording process whenever the signal becomes too large or too small to be accurately recorded.

Figure 2:
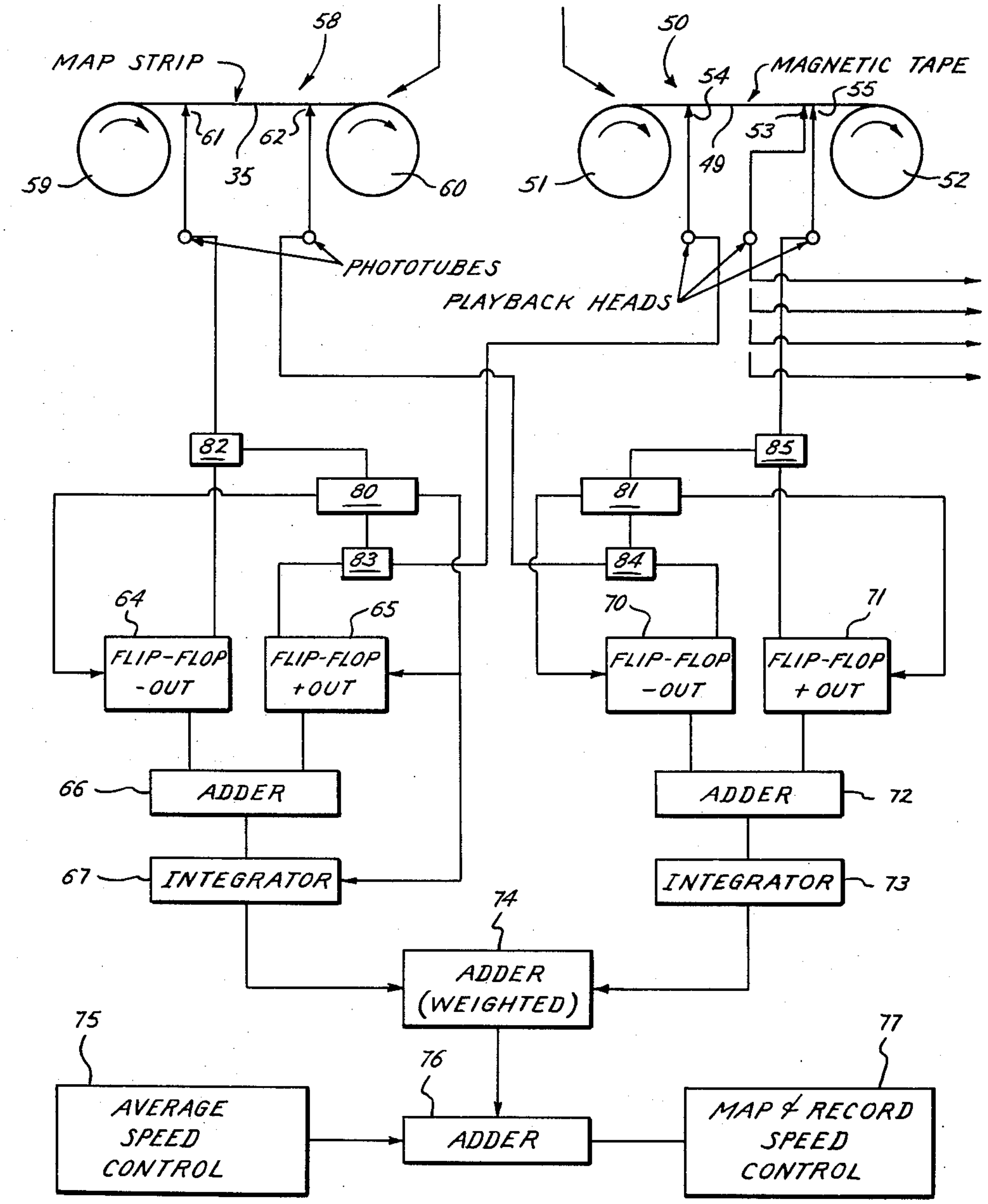
FIGURE 2 is a schematic drawing illustrating method and apparatus of the invention for converting the field-time records to field-distance records.

Referring now to FIGURE 2, in order to convert the field-time and altimeter-time record 49 from recorder 43 into a field-distance and altimeter distance records, the record 49 is run through a play-back or reproducer 50, comprising supply and storage reels 51, 52. Four magnetic-electric transducers or pick-up heads 53 are placed respectively on the four channels of the tape 49 corresponding to the altimeter and three magnetometer records. Their outputs are fed to a variable speed four channel magnetic tape recorder 100 (shown in FIGURE 3) whose speed is controlled, as will be described, so as to effect the desired conversion from a time to distance record. The diurnal variation is not actually converted to a field-distance record but to a field-time record in which the time scale is variable so that when synchronized with the field-distance records it will indicate the earth's field at the fixed station that existed at the time of measurement of each position on the field-distance records.

Referring again to FIGURE 2, in order to control the speed of recorder 100, two magnetic-electric transducers or pick-ups 54, 55 are provided on the fiducial pulse track of record 49. The pick-ups 54, 55 are spaced apart a distance equal to the spacing of the fiducial pulses on record 49. Pick-up 55 is placed adjacent heads 53 to pick up pulses recorded simultaneously with the data that heads 53 pick up. The outputs of these pick-ups is compared with signals produced by running map strip 35 through a variable speed visual record playback 58 comprising supply and storage reels 59, 60. Two photoelectric transducers or pick-ups 61, 62 are placed adjacent the single track of the map strip to respond to the markings thereon corresponding to points A, B, C, etc. The spacing of transducers 61, 62 is equal to an estimated average of the actual spacing of points A, B, C, etc. and may, for example, be chosen as equal to the distance to the scale of the map strip, that would be travelled by the survey aircraft during the time between fiducial pulses of generator 25 were the aircraft to travel at the intended speed of the traverse, e.g., 150 miles per hour, at a constant altitude, e.g., 500 feet.

The outputs of the lead transducers 61 and 54 are fed to flip-flop circuits 64, 65 to trigger their outputs. The outputs of flip-flop circuits 64, 65, when both have been triggered, are of opposite polarity. Their outputs are fed to electric means 66 for adding them and the output of adder 66 is fed to electric means 67 for integrating the output. Likewise, the outputs of coincident pick-ups 62, 55 (coincident, that is, with pick-ups 53) are fed to flip-flop circuits 70, 71 whose outputs when triggered are of opposite polarity and which outputs are fed to electric means 72 for adding them. The output of adder 72 is integrated by electric means 73 and the output of integrator 73 is added to the output of integrator 67 in electric means 74. The addition performed in adder 74 is weighted as desired to accentuate more or less the effect of the lead heads relative to the coincident heads.

Output of adder 74 is combined with the output of manually adjustable voltage generator 75 in electric adding means 76 and the resulting output used to control electric means 77 which in turn controls the speed of the motor driving synchronously the recorder 100 and playback 58. Speed controller 77 may be of the thyratron type referred to in the aforementioned copending United States patent application of W. P. Jenny, Serial Number 2,138, or may be of the transistor type hereinafter decribed.

By the foregoing means the speed of map strip pick-up 58 is varied relative to the speed of tape playback 50 so as to insure simultaneous or near simultaneous passage of the fiducials of the tape by pick-ups 53 and the passage of markings A, B, C, etc. on the map strip by pick-up 62. The lead pick-ups 61 and 54 detect differences in the positions of the markings on tape and map strip in advance of the tape markings reaching pick-ups 53 and change the speed of the map strip drive motor to cause the markings on the tape and map strip to reach the coincidence pick-ups 62 and 55 and the pick-ups 53 all at the same time. Any departure from simultaneity is detected by coincidence pick-ups 62, 55 to correct the speed of the motor driving map strip pick-up 58 to correct the error. Integrator 73 from the coincidence pick-ups is cumulative so that the error does not forever increase in case the initial correction applied by integrator 73 is insufficient. Integrator 67 on the other hand is not cumulative so that its output is proportional to the current difference in arrival times of the marks at the lead pick-ups, being reset after each passage of the fiducial marks at the same time the several flip-flop circuits are reset.

The reset means are indicated at 80 and 81. In order to provide opposite polarity pulses for triggering and resetting the flip-flop circuits, the outputs of the four fiducial mark pick-ups 54, 55, 61, 62 are first fed through differentiators 82, 83, 84, 85.

Figure 3:
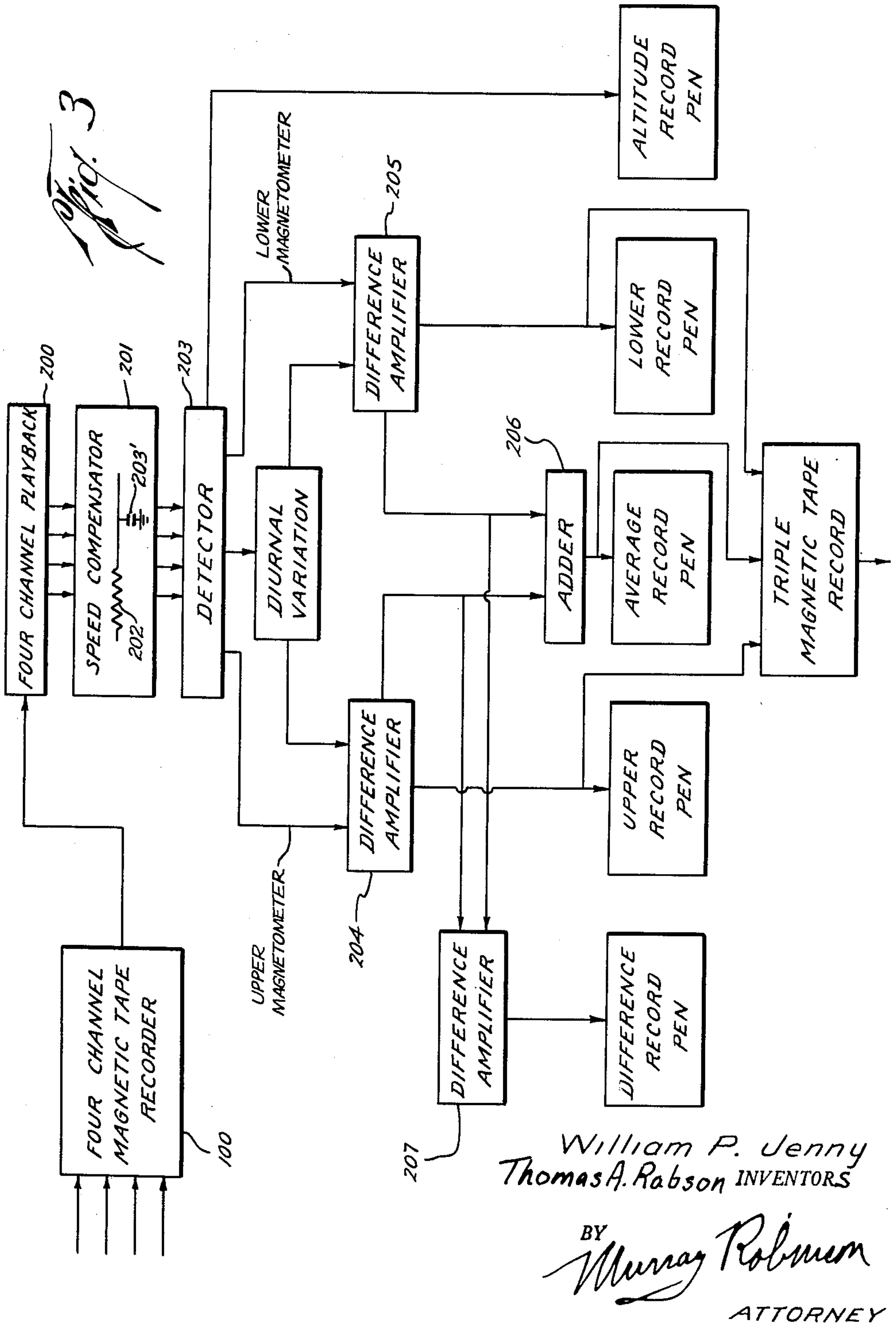
FIGURE 3 is a schematic drawing illustrating method and apparatus of the invention for correcting for diurnal variation and producing records of various functions of the corrected field-distance records.

Referring now to FIGURES 6 through 9 there is shown the electric circuit detail of the apparatus shown schematically in FIGURE 2 and a portion of that shown in FIGURE 3. The outputs of pick-ups 61, 62, 54, 55 are fed to circuits 82, 84, 83, 85 to divide up each fiducial pulse into a pair of opposite polarity pulses. Each circuit 82–85 comprises, referring to circuit 82 for particularity, an RC differentiator circuit 101, 102 whose output is fed to oppositely connected rectifiers 103, 104.

Flip-flop circuits 64, 65, 70, 71 have normal outputs of zero volts; on receipt of negative pulses from rectifiers 103 the outputs of circuits 64, 70 become −V volts while the outputs of circuits 65, 71 become +V volts. The outputs of circuits 64 and 65 are added through resistors 105, 106, 107 which make up previously referred to adder 66. The sum of +V and −V volts is zero so that the output of adder 66 is a pulse of +V or −V volts depending on which flip-flop circuit is triggered first and of a duration equal to the time interval between the triggering of the two circuits. The pulse from adder 66 is fed to integrating capacitor 67.

In similar manner the outputs of circuits 70, 71 are added through resistors 108, 109, 110 which make up adder circuit 72, previously referred to, and the output of the adder fed to integrator 73 which includes capacitor 112 and D.C. amplifier 113 whereby the output of integrator 73 for a given pulse input may be adjusted relative to that of integrator 67. The outputs of integrators 66 and 73 are combined in adder 74. The output of adder 74 is combined with the output of potentiometer 75 in adder 76 and the output fed to the motor speed controller through damping network 115.

The positive pulses from rectifiers 104 of the several pulse dividers 82–85 are used to reset the flip-flop circuits and discharge integrating capacitor 67 after each operation thereof and before succeeding fiducial pulses arrive. To this end the outputs of rectifiers 104 of pulse dividers 82, 83 are combined and fed to RC circuit 120 whose time constant is such as to be responsive to but one pulse per second. Whichever positive pulse, from pulse divider 82 or 83, arrives first causes RC circuit 120 to trigger single pulse multivibrator 121.

The output of multivibrator 121, which will be a pulse of predetermined definite size, is divided. A portion of the output is fed to a discharge circuit 125 comprising two vacuum tubes in parallel but oppositely connected so that the circui,t normally biased to cut off, will be prepared to conduct both ways on receipt of a positive pulse from the multivibrator. The discharge circuit will then discharge integrating capacitor 67 regardless of the polarity of its charge. The voltage on the plates of the tubes is such that in the time the tube is conducting, sufficient current can flow to insure that capacitor 67 is fully discharged.

Another portion of the multivibrator output is fed to polarity converter circuit 130 comprising a pair of vacuum tube amplifiers shown in a single envelope connected in parallel with like polarities together to produce negative pulses on receipt of a positive pulse from the multivibrator. These negative pulses are fed to the flip-flop circuits 64, 65 to return them to their normal zero output condition.

Similarly the positive outputs of rectifiers 104 from dividers 84, 85 are combined and fed to time constant circuit 150 whose output controls single pulse multivibrator 151 which is fed to polarity conversion circuit 152 to reset flip-flop circuits 70, 71. There is no division of the output of multivibrator 151 since integrator 73 is not discharged after the passage of each set of fiducial marks.

Figure 10:
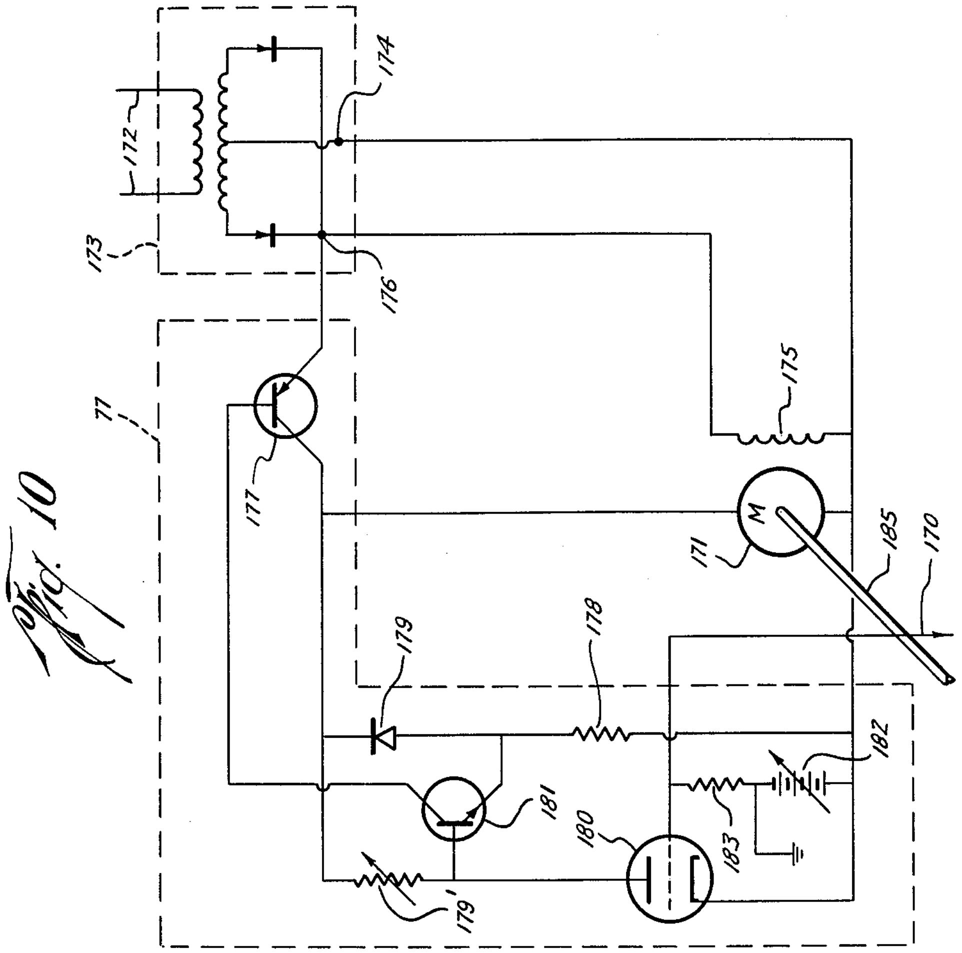
Figure 11:
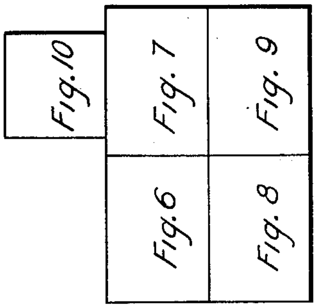
FIGURE 11 is a diagram showing how

Referring now to FIGURE 10, the output of adder 76 and damping network 115 (FIGURE 9) is fed to speed control network 77 via conductor 170. The motor whose speed is to be controlled is shown at 171. A source 172 of alternating current is rectified by full wave rectifier 173. Center tap 174 connects directly to the armature of motor 171 and to its field 175. The other output terminal 176 of the rectifier also connects directly to field winding 175 and through transistor 177 to the armature of motor 171. In parallel with the motor armature are the series connected resistor 178 and regulating diode 179. Also in parallel with the motor armature are the series connected variable resistor 179′ and triode 180. A transitor 181 has its emitter connected to the juncture of diode 179 and resistor 178; the collector of transistor 181 is connected to the base of transistor 177; therefore the conductivity of transistor 181 controls the conductivity of transistor 177 and thereby the speed of motor 171. The base of transistor 181 is connected to the juncture of resistor 179′ and triode 180 so that the conductivity of the triode controsl the conductivity of transistor 181. In turn the conductivity of triode 180 is controlled by the potentials imposed on its grid which is connected to conductor 170 and which also has manually variable voltage source 182. Source 182 is adjusted to control the average speed of motor 171 while the signals from conductor 170 appearing across resistor 183 vary the motor speed to maintain coincidence of the fiducial marks on the record 49 and the markings A, B, C, etc. on map strip 35, the motor 171 driving not only recorder 100 through shaft 185 but also playback 58 through chain 186 engaging sprocket 187 on shaft 185 and sprocket 188 on shaft 189. Playback 50 is driven at constant speed by a suitable motor not shown.

Referring now to FIGURE 3, the magnetic tape produced by recorder 100 is fed to playback reproducer 200 having four pick-ups which take off the converted records and feed to speed compensator 201. The record made by recorder 100, being made at variable speed, is frequency modulated as well as amplitude modulated. The pick-up heads of playback reproducer 200 being of the inductive type will produce an output that is amplitude modulated in response to and proportional to the frequency modulation of the magnetic tape records as well as their amplitude modulation, just as the voltage of an ordinary generator depends both on the speed of the rotor and the magnitude of the field. The speed compensator 201 comprises an RC network indicated generally at 202, 203′ whose output is inversely proportional to the frequency thereby neutralizing the amplitude distortion caused by the frequency modulation of the record fed to playback 200.

The outputs of speed compensator 201 feed to detector 203. The four detected outputs are then separately treated. The output for the upper magnetometer and for the dirurnal variation are fed to difference amplifier 204 while the output for the lower magnetometer and the diurnal variation are fed to difference amplifier 205. The outputs of the difference amplifiers are averaged in adder 206 and subtracted in difference amplifier 207. A five pen recording is then made of the altitude output from detector 203 along with the outputs from the difference amplifiers 204, 205, and 207 and adder 206. Finally, the outputs of difference amplifier 204 and 205 and adder 206 are also fed to a triple channel magnetic tape recorder producing a triple channel tape recording. This triple channel tape recording will be referred to as the corrected record, being similar to the converted record produced by recorder 100 but having the frequency modulation removed and the diurnal variation subtracted out and having in place of the records of diurnal variation and altitude a record of the average of the upper and lower magnetometer records to accompany the separate corrected records of the upper and lower magnetometers.

Figure 4:
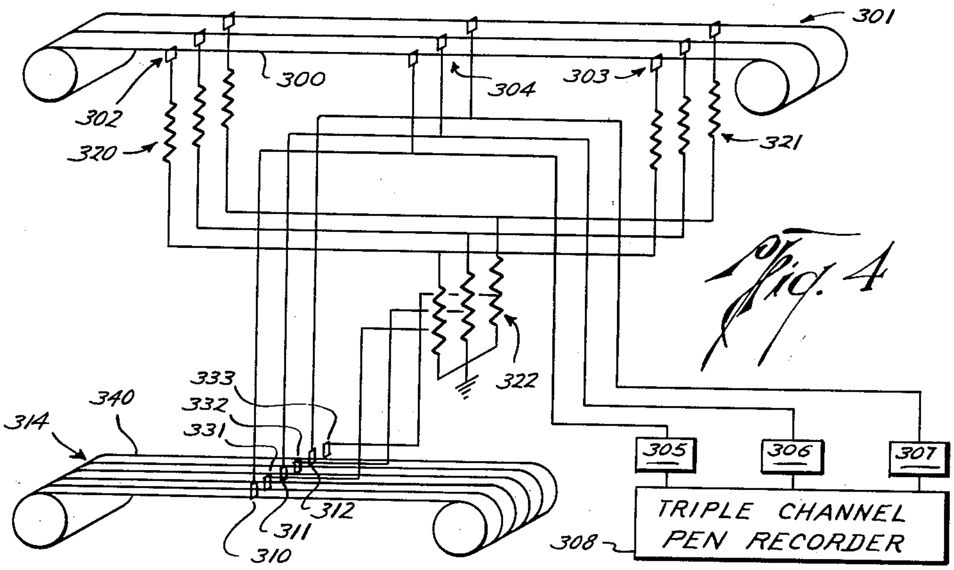
FIGURE 4 is a schematic drawing illustrating method and apparatus for the preparation of the chorded record from the field-distance record after correction for diurnal variation.

Referring now to FIGURE 4, the triple channel corrected record just referred to is shown at 300 in playback 301. Playback 301 has two sets of spaced apart pick-up heads 302 and 303 and a third set of pick-up heads 304 midway therebetween, there being three pick-up heads in each set, one for each channel. The outputs of the central pickups 304 are fed to second derivative networks 305, 306, 307 whose outputs feed triple channel pen recorder 308. The record thus provided will be referred to as the second derivative record.

The outputs of the central pick-ups 304 also feed to three recording heads 310, 311, 312 of six channel recorder 314.

The outputs of pick-up 302 and 303 are added and averaged by resistor networks 320, 321, 322, the resultant outputs corresponding to the midpoint ordinates of chords of the curves that would be plotted from the record 300 if fed to a pen recorder, the lengths of the chords being dependent on the spacing of pick-ups 302, 303. The resultant "chorded" outputs are combined with the outputs of pick-up heads 304 in recording heads 331, 332, 333. There is thus recorded simultaneously by six channel recorder 314 corrected records of the upper and lower magnetometers and their average and also three chorded curves based thereon. This six channel record is designated 340.

Figure 5:
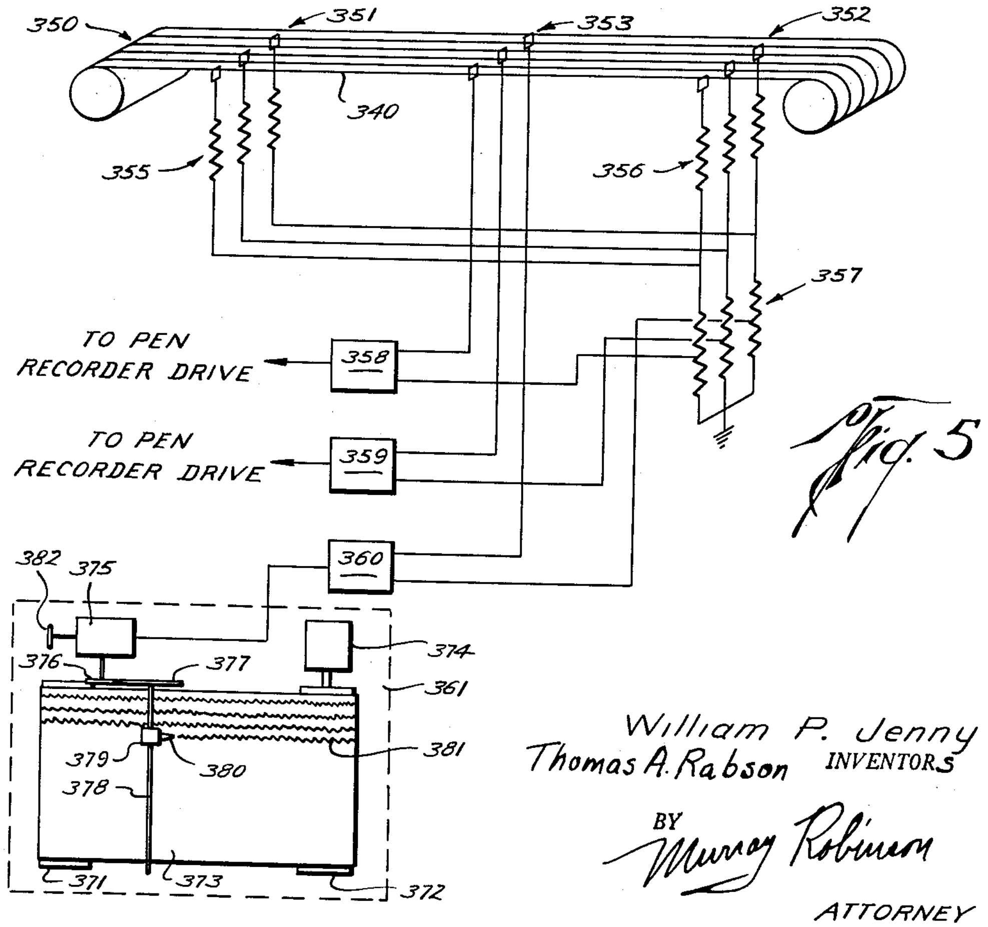
FIGURE 5 is a schematic drawing illustrating method and apparatus for the production of the chord-difference record from the chorded record and the corrected field-distance record.
Figure 6:
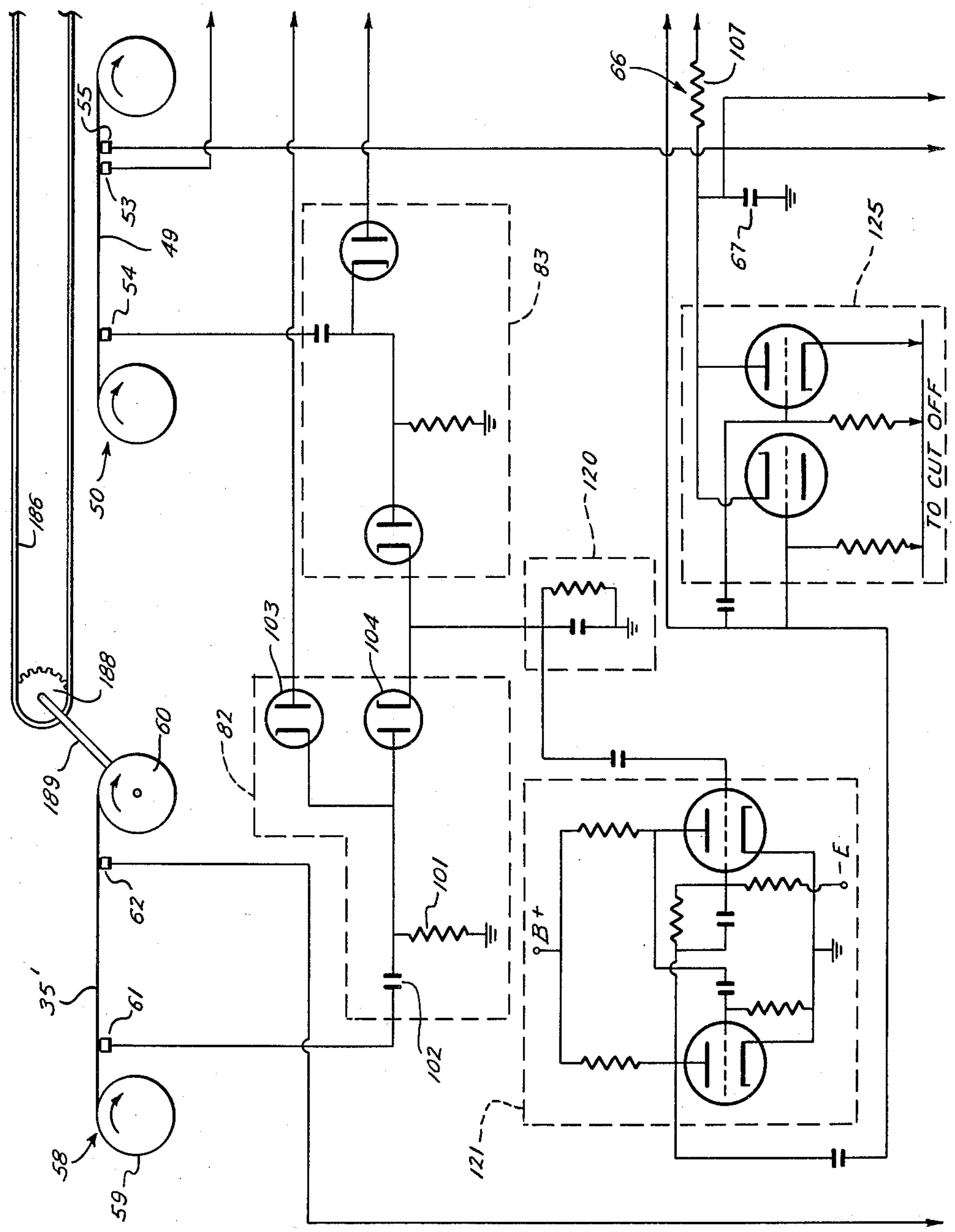
FIGURES 6 through 10 are an electric circuit diagram detailing the apparatus of FIGURE 2.
Figure 7:
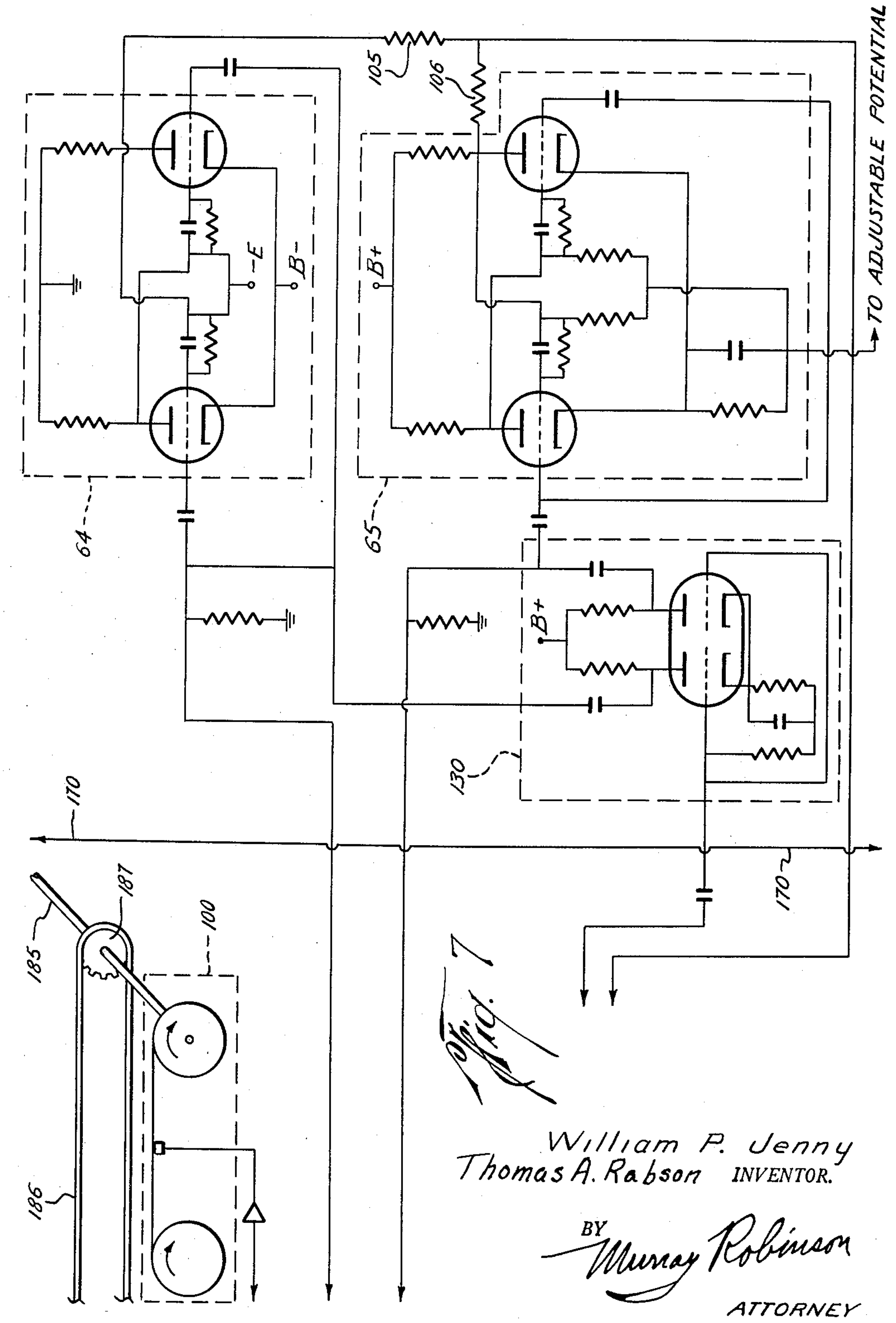
Figure 8:
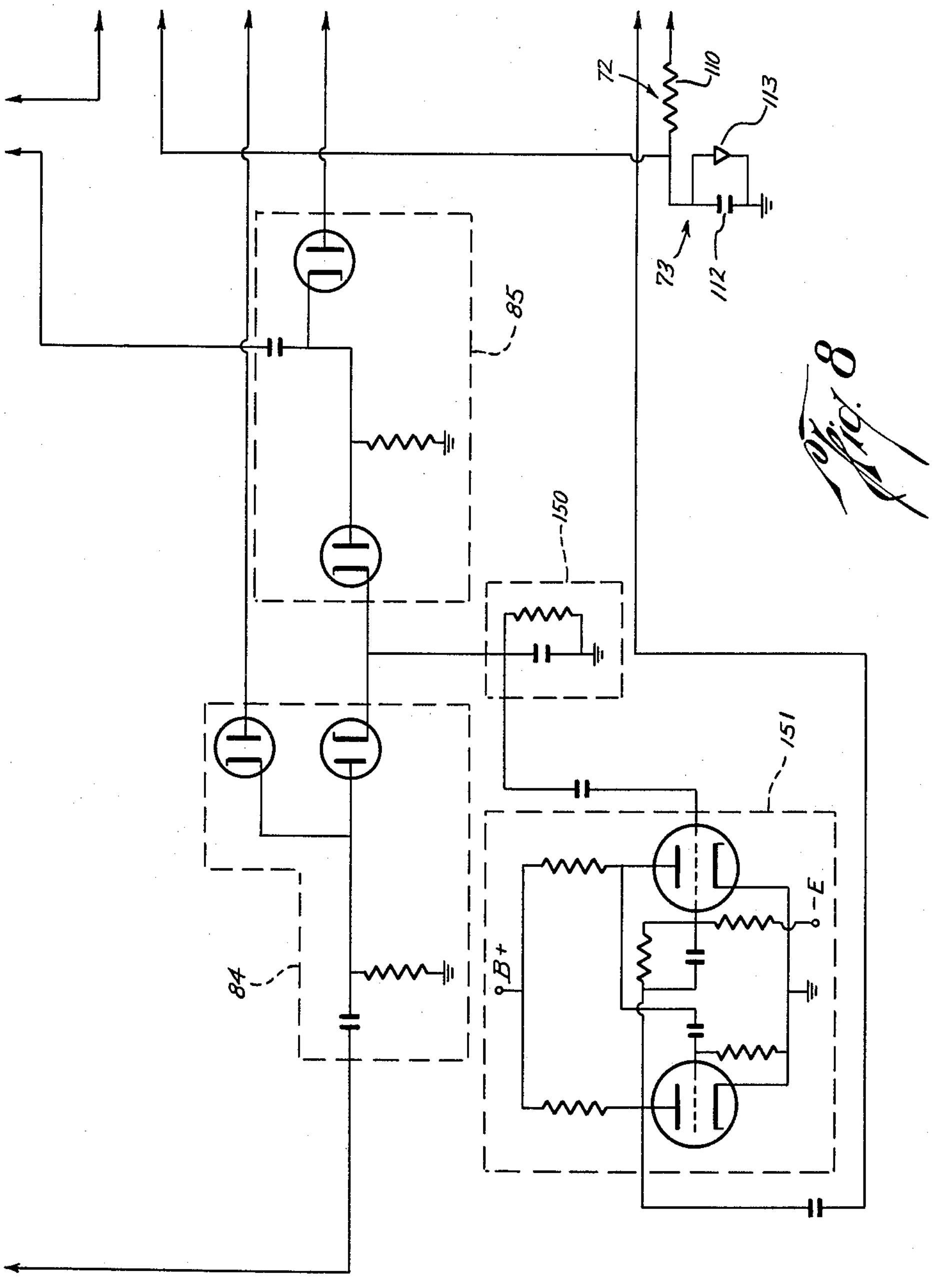
Figure 9:
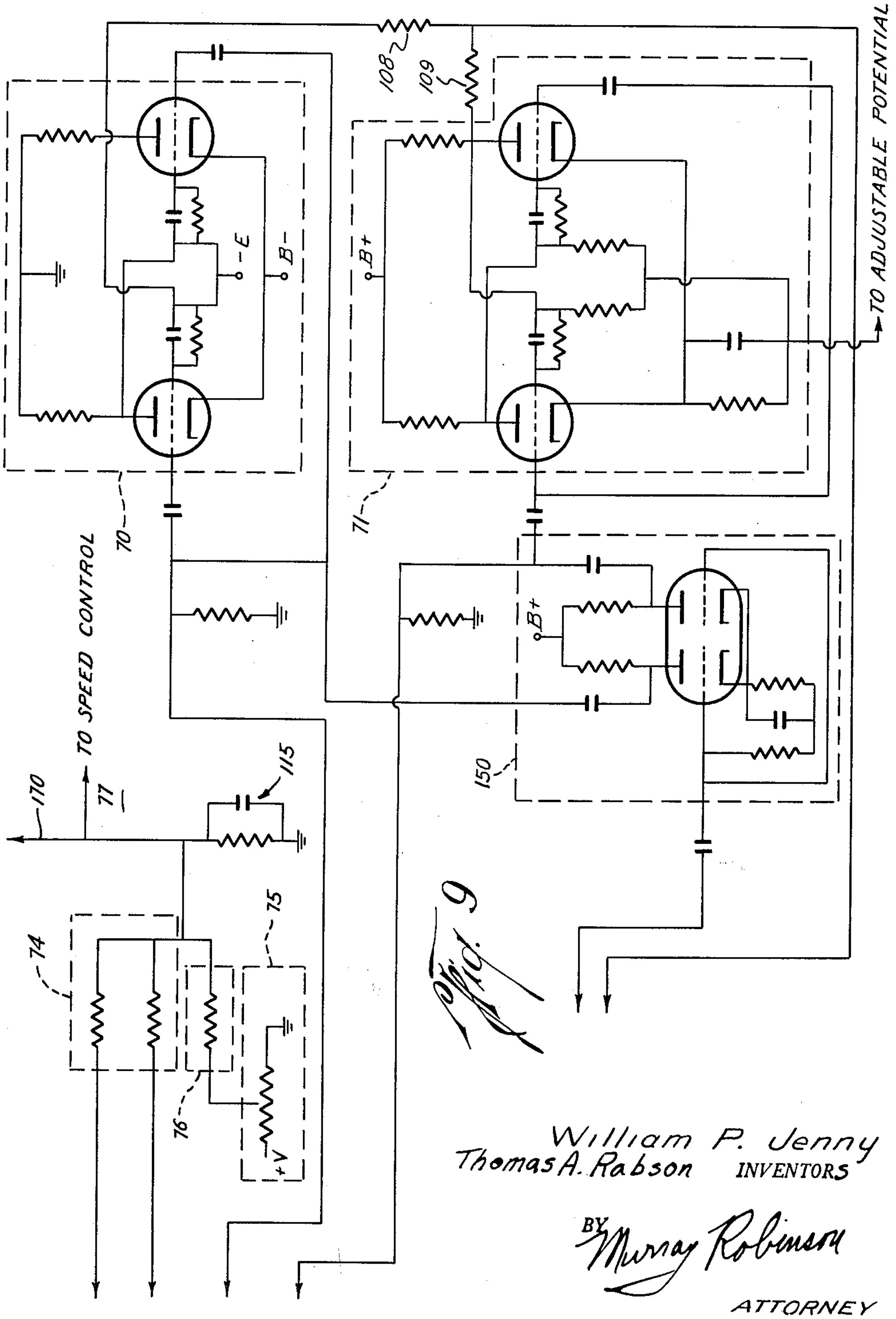

Referring now to FIGURE 5, the record 340 is run through a playback 350 having two sets of spaced apart pick-up heads 351, 352 and a third set of pickup heads 353 disposed midway therebetween with three heads in each set similar to the FIGURE 4 arrangement except that the outside groups are spaced apart a different distance from those of FIGURE 4 and are on the three tracks of the chorded record rather than on the three tracks of the original record relative to which travel the middle group of pick-ups. The outputs of the outer groups of pick-up heads are added and averaged by resistance networks 355, 356, 357 and the result from each track is fed together with the output of the corresponding one of the central group of pickups 353 to one of the difference amplifiers 358, 359, 360. The outputs of the difference amplifiers are fed to three pen recorders such as 361 to produce the desired chorded difference records.

The chording process of FIGURES 4 and 5 may be repeated with different chord distances, i.e., spacing of the outer groups of pick-up heads, as many times as desired, before taking the differences between the chorded outputs and the outputs of the original record. The repeated chording process produces a base curve of slow variations, which represent essentially regional basement and stratigraphic conditions from which local anomalies appear most clearly. In some circumstances where the deviations are slow the single chording of FIGURE 4 may be sufficient by itself, in which case instead of pick-up heads 331, 332, 333, there would be provided difference amplifiers as in FIGURE 5, feeding the three pen records.

Of course the method of the invention is applicable to the recording of a single or any number of magnetometers. However the use of high and low level magnetometers is preferred since this makes possible the preparation of four related maps from which comparisons can be made to aid in interpretation.

The four maps made possible by the use of both high and low level magnetometers will be those based on the output of difference amplifiers 358, 359, 360 of FIGURE 5 and the difference amplifier 207 of FIGURE 3.

It is to be understood that the chorded difference curves from a plurality of traverses in the same general area will be placed on a single chart or map with the distance axes or base lines spaced apart distances equal to the distances between traverses to a scale preferably the same as the distance scale of each record. To this end the pen recorders such as 361 shown in FIGURE 5 may comprise a pair of paper winding drums 371, 372 over which the map paper 373 is wound, take-up drum 372 being driven at constant speed by motor 374. The output of difference amplifier 360 feeds motor 375 which turns pinion 376 causing gear 377 to rotate. Gear 377 drives lead screw 378 moving nut 379 axially. Pen 380 carried by the nut thus moves transverse to the direction of paper travel to draw the desired profile curve 381 for one magnetometer traverse. After each traverse is recorded, reset button 382 is actuated to cause the drive motor 375 to be rotated to shift the base line for the pen.

By way of example, there may be thirty traverses recorded on the map 373. With a scale of one inch equals three thousand feet, and with traverses taken a half mile from each other and each traverse about one hundred miles long, the resulting map would be a little over two feet wide and a little over ten feet long. On such a map a magnetic field scale of one inch equals ten gammas would be suitable. Interpretation of the resulting maps will then be made in the usual manner, but the greater accuracy of the chart will facilitate better results.

Certain features of the invention are also applicable to data obtained from gravity surveys and other exploration methods.

While a preferred embodiment of the invention has been shown and described, many modifications thereof will be apparent to one skilled in the art without departing from the spirit of the invention and it is desired to protect by Letters Patent all forms of the invention falling within the scope of the following claims:

1. Method of preparing correlated high resolution function earth's magnetic field maps comprising the steps of moving an aerial body in a plurality of parallel traverses close above the earth's surface while simultaneously making a first magnetic tape record of the earth's magnetic field versus time at a point in the vicinity of said traverses that is fixed relative to the earth, making a second magnetic tape record of the earth's magnetic field versus time during each traverse at a plurality of vertically spaced apart points that are substantially fixed relative to said body and simultaneously making a photographic record of the topography beneath the body versus time as said topography changes due to the movement of the body, marking said second magnetic tape record and photographic record simultaneously at successive points of time during each traverse, simultaneously playing back said first and second magnetic tape records and recording them together on a third magnetic tape record, preparing from the time-topography record a control tape bearing indicia corresponding in number with said markings on said time-topography record but spaced apart distances proportional to the average velocity of said body during the time intervals between the successive markings of said record divided by the corresponding distances apart of the successive markings on said time-topography record, scanning at constant speed said third magnetic tape record with respect to said markings and simultaneously scanning said control tape with respect to said indicia, determining the differences in arrival times at a first point of said markings and indicia, producing first electric signals having a parameter successively proportional to each of said differences, determining the difference in arrival times of said markings and indicia at a second point spaced downstream from said first point with respect to the relative motions of said third magnetic tape record and control tape, producing second electric signals having a parameter continuously proportional to the accumulated algebraic sum of the last said differences, producing third electric signals having a parameter proportional to the sum of the parameters of said first and second signals, varying the speed of scanning of said control tape in response to said parameter of said third electric signals to maintain at a minimum the magnitude of said differences in arrival times at said second point, simultaneously scanning said third magnetic tape record with respect to the field-time record thereon at a point adjacent said second point to produce fourth electric signals representative thereof, making from said fourth electric signals a fourth magnetic tape record on a magnetic tape recorded upon in synchronism with the scanning of said control tape, scanning said fourth magnetic tape record at constant speed to produce fifth electric signals modifying said fifth electric signals to eliminate therefrom variations in magnitude due to the variable speed of recording of said fourth magnetic tape record, producing from said fourth magnetic tape upper net signals proportional to the difference between those of the fourth signals derived from the field-time record made at the upper level during each traverse and the signals derived from the first magnetic tape record, producing from said fourth magnetic tape lower net signals proportional to the difference between those of the fourth signals derived from the field-time record made at the lower level during each traverse and the signals derived from the first magnetic tape record, producing first difference signals from said upper and lower net signals by subtracting one from the other, visibly recording said first difference signals, producing average net signals from said upper and lower net signals by adding said upper and lower net signals, making a fifth magnetic tape record by simultaneously recording said upper, lower, and average net signals, scanning said fifth magnetic tape record with respect to each of the three net signals recorded thereon at three equally spaced points for each signal record to produce from the three center scanning points reproductions of said upper, lower and average net signals while combining the signals derived from the outermost scanning points for each recorded signal to produce first, second and third chorded average signals, simultaneously recording said reproduced upper, lower, and average net signals and said first, second and third chorded average signals to produce a sixth magnetic tape record, scanning said sixth magnetic tape record with respect to each of the six signals recorded thereon, the scanning of the records of each of said first, second and third chorded average signals being done at each of two spaced apart points spaced differently from the distance between said outermost points of scanning said fifth magnetic tape record and the scanning of the records of each of said reproduced upper, lower, and average net signals being done at a point midway between the adjacent two points of scanning of the adjacent one of the records of said first, second and third chorded average signals to produce second reproductions of said upper, lower and average net signals, and combining the signals produced from scanning at said two spaced apart points as to each of said records of the first, second and third chorded average signals to produce first, second, and third re-chorded average signals, producing second difference signals by subtracting said first re-chorded average signals from said second reproduction of said upper net signals, producing third difference signals by subtracting said second re-chorded average signals from said second reproduction of said lower net signals, producing fourth difference signals by subtracting said third re-chorded average signals from said second reproduction of said average net signals, and visibly recording said second, third, and fourth difference signals, the visible recording of each of said difference signals each being divided into a plurality of curves, one for each traverse, and the base line being shifted for each curve in proportion to the traverse spacing, the visible recordings of said first, second, third and fourth difference signals providing four separate but correlated field intensity versus distance maps.

2. Method of producing an electric signal having a parameter varying with time in correspondence with variations in the earth's magnetic field dependent on change in position relative to the earth comprising the steps of moving an aerial body in a traverse close above the earth's surface, making a magnetic tape record of the earth's magnetic field versus time during the traverse at a point that is substantially fixed relative to said body, and simultaneously making a photographic record of the topography beneath the body versus time as said topography changes due to the movement of the body, marking said magnetic tape record and photographic record simultaneously at successive points of time during each traverse, preparing from the time-topography record a control tape bearing indicia corresponding in number with said markings on said time-topography record but spaced apart distances proportional to the average velocity of said body during the time intervals between the successive markings of said time-topography record divided by the corresponding distances apart of the successive markings on said time-topography record, scanning at constant speed said magnetic tape record with respect to said markings and simultaneously scanning said control tape with respect to said indicia, determining the differences in arrival times at a first point of said markings and indicia, producing first electric signals having a parameter successively proportional to each of said differences, determining the difference in arrival times of said markings and indicia at a second point spaced downstream from said first point with respect to the relative motions of said magnetic tape record and control tape, producing third electric signals having a parameter continuously proportional to the accumulated algebraic sum of the last said differences, producting third electric signals having a parameter proportional to the sum of the parameters of said first and second signals, varying the speed of scanning of said control tape in response to said parameter of said third electric signals to maintain at a minimum the magnitude of said differences in arrival times at said second point, simultaneously scanning said magnetic tape record with respect to the field-time record thereon at a point adjacent said second point to produce fourth electric signals representative thereof, making from said fourth electric signals a second magnetic tape record on a magnetic tape moved in synchronism with said control tape, scanning said second magnetic tape record at constant speed to produce fifth electric signals, and modifying said fifth electric signals to eliminate therefrom variations in magnitude due to the variable speed of recording of said second magnetic tape record.

3. Method of producing from first electric signals having a parameter varying with time in correspondence with variations in the earth's magnetic field dependent on change in position relative to the earth and corrected for diurnal variation, a visual record including a curve corresponding to the difference between said first electric signals and second electric signals corresponding to the slow variations of said field which represent essentially regional basement and stratigraphic conditions comprising the steps of making a magnetic tape record of said first signals, scanning said magnetic tape record at three equally spaced points to produce from the center scanning point a reproduction of said first signals while combining the signals derived from the outermost scanning points to produce chorded average signals, simultaneously recording said reproduced signals and said chorded average signals to produce a second magnetic tape record, scanning said second magnetic tape record with respect to each of the two signals recorded thereon, the scanning of the record of each of said chorded average signals being done at each of two spaced apart points and the scanning of the record of said reproduced signals being done at a point midway between the adjacent two points of scanning of the adjacent record of said chorded average signals to produce a second reproduction of said reproduced signals and combining the signals produced from scanning at said two spaced apart points to produce re-chorded average signals, producing a signal that is the difference between said second reproduction of said reproduced signals and said re-chorded average signals, and making a visible recording thereof.

4. Apparatus useful in the conversion of a magnetic tape record of time versus field intensity into an electric signal corresponding to a second record of position versus field intensity wherein the position variable of the second record is a non-linear function of the time variable of the first said record as evidenced by the variable spacing of indicia on a control tape as compared to the uniform spacing of fiducial markings on said magnetic tape comprising first play-back means for the magnetic tape, a second play-back means for the control tape, said first play-back means including a first pick-up means, a second pick-up means spaced therefrom along the length of the tape in the direction of movement thereof, and third pick-up means adjacent said second pick-up means, said second play-back means including a fourth pick-up means, a fifth pick-up means spaced therefrom along the length of the tape in the direction of movement thereof a distance equal to the spacing of said first and second pick-up means, first electronic means responsive to the differences in arrival times at said first and fourth pick-up means of said fiducial markings and indicia to produce a first electronic signal that is proportional to said differences, a second electronic means responsive to the differences in arrival times at said second and fifth pick-up means of said fiducial markings and indicia to produce a second electric signal that is proportional to the accumulated algebraic sum of the last said differences, speed control means responsive to the sum of said first and second electric signals to adjust the speed of said second play-back means to maintain at a minimum said difference in said arrival times at said second and fifth pick-up means, a magnetic tape recorder means driving said recorder in synchonism with said second play-back means, said recorder including a recording head, means electrically connecting said recording head to said third pick-up means, a third play-back means for playing back at constant speed the record produced on said recorder, said third play-back means including a sixth pick-up means and frequency responsive means connected to said sixth pick-up means to modify the signal therefrom to eliminate variations therein of the parameter thereof representative of field intensity caused by the variable speed of recording on said magnetic tape record.

5. The combination of claim 4 in which each of said first and second electronic means includes a pair of flip-flop circuits each connected to one of said pick-up means to produce opposite polarity signals in response to arrivals of said fiducial markings and indicia respectively, means for adding said signals from said pair of flip-flop circuits to reduce the net signal to zero after both circuits have been energized and means for integrating the added signals to produce a resultant signal proportional to the duration of said net signal.

6. The combination of claim 4 in which the frequency responsive means comprises an RC network.

7. In a method of producing from a magnetic tape record of the earth's magnetic field around a magnetic field responsive device versus time as the device is moved in a traverse above the earth's surface and a photographic record of the topography beneath said device versus time as said topography changes due to said movement of the device in said traverse a record of the magnetic field versus distance along the traverse the aforesaid magnetic tape record and said photographic record each having been simultaneously impressed with time fiducial signals at intervals during said movement of the device in said traverse, the steps of preparing from the time-topography record a control tape bearing indicia corresponding in number with the impressions of said fiducial signals on said time-topography record but spaced apart distances proportional to the actual distances apart of the topographically determined positions corresponding to said time fiducial signals, magnetically scanning at constant speed said magnetic tape record with respect to the impressions of said time fiducial signals thereon and simultaneously photoelectrically scanning said control tape with respect to said indicia, determining the differences in arrival times of said impressions on said magnetic tape and said indicia on said control tape during said scannings, producing first electric signals in response to said differences, varying the speed of scanning of said control tape in accordance with said first electric signals to maintain substantial coincidence of arrival times of said magnetic tape record impressions and said control tape indicia during said scannings, simultaneously scanning said magnetic tape record with respect to the field-time record thereon in time phase with said scanning of said magnetic tape record with respect to said impressions of the fiducial signals thereon to produce second electric signals, and making a recording from said second electric signals at a speed of recording synchronized with the speed of scanning of said control tape.

8. In a method of producing a record of the earth's magnetic field versus distance along a traverse line from a record of the earth's magnetic field in the vicinity of a magnetic field sensitive device versus time as the device is moved along said traverse, said field-time record also bearing the impressions of time fiducial signals at intervals during the traverse and a control tape bearing indicia spaced apart distances proportional to the actual distances apart of the positions of said device at the different times of impression of said time fiducial signals on said record, the steps of scanning said field-time record both as to said field record thereon and said fiducial impressions to produce first and second electric signals, and simultaneously scanning said control tape as to said indicia to produce third electric signals, and simultaneously recording the first signals, while varying the speed of scanning of said control tape in response to the difference between said second and third signals to maintain substantial coincidence thereof, and varying the speed of recording of said first signals to maintain same in synchronism with said scanning of the control tape.

9. Method of converting an amplitude modulated alternating current signal first magnetic tape record of magnetic field versus distance having a non-linear distance scale into an amplitude and frequency modulated second magnetic tape record whose combined modulation is true on a linear distance scale comprising the steps of scanning said non-linear record at constant speed to produce first amplitude modulated alternating current electric signals, recording said first signals on a third magnetic tape while varying the speed of recording to produce a record whose amplitude modulation is a true record to a linear distance scale but is also frequency modulated due to the variable speed of recording, scanning said third magnetic tape at constant speed to produce second alternating current amplitude and frequency modulated signals, passing said second signals through a network whose output is an inverse function of the frequency of the input, and recording the output of said network on said second tape.

10. Method of producing from first electric signals having a parameter varying with time in correspondence with variations in the earth's magnetic field dependent on change in position relative to the earth, a visual record including a curve corresponding to the difference between said first electric signals and second electric signals corresponding to the slow variations of said field which represent essentially regional basement and stratigraphic conditions comprising the steps of chording said first electric signals any desired number of times, but at least once, to produce said second electric signals, combining said first and second electric signals to produce third electric signals that are proportional to the difference between said first and second electric signals, and making a visible recording of said third signals, said visible recording constituting the desired aforementioned visual record, said chording comprising in the first instance the steps of making a magnetic record of said first signals, and scanning said magnetic tape record at three equally spaced points to produce from the center scanning point a reproduction of said first signals while combining the signals derived from the outermost scanning points to produce chorded average signals, said chording in any successive instance comprising the steps of simultaneously making a magnetic tape dual recording of the last made of said reproduction of said first signals and the last made of said chorded average signals, and scanning said dual recording at three equally spaced points with the outermost points located on the record of said chorded average signals and the center point on the reproduced record of said first signals to produce from the center scanning point a reproduction of said first signals while combining the signals derived from the outermost scanning points to produce a chorded average signal, said chorded average signals from the last chording step constituting said second signals and said first signals being derived for combining with said second signals by taking them from the last record made thereof.

11. Apparatus for coordinating a first tape record bearing in addition to a primary magnetic record the impressions of a fiducial time signal at intervals therealong with a control tape bearing indicia spaced apart therealong so that the time of arrival of said impressions and indicia at selected reference points is substantially simultaneous comprising first playback means for said first tape including two spaced apart first and second pick-up means, second playback means for said control tape including two spaced apart third and fourth pickup means, first electric means responsive to the differences in arrival times at said first and third pickup means of said impressions and indicia to produce a first signal that is proportional to said differences, second electric means responsive to the differences in arrival times at said second and fourth pickup means of said impressions and indicia to produce a second signal that is proportional to the accumulated algebraic sum of the last said differences, and speed control means responsive to the sum of said first and second electric signals to adjust the speed of said second playback means to maintain at a minimum said differences in said arrival times at said second and fourth pickup means.

12. The combination of claim 11 in which each of said first and second electric means includes:

a pair of flip-flop circuits each connected to one of said pickup means to produce opposite polarity signals in response to arrivals of said impressions and indicia respectively, means for adding said signals from each pair of flip-flop circuits to reduce the net signal to zero after both circuits have been energized, and means for integrating the added signals to produce a resultant signal proportional to the duration of said net signal.

13. The combination of claim 12 in which each of said first and second electric means further includes:

a pair of pulse dividing means, one of said pulse dividing means being disposed in the connection between each flip-flop and the one of said pickup means to which it is connected, reset means connected to each flip-flop for restoring it to its initial condition prior to receipt of signals from said pickup means, each pulse divider sending a portion of its output to one of said flip-flops and a portion to said reset means.

14. The combination of claim 13 in which the reset means of the second electric signal means is also connected to said means for integrating the added signals of the pair of flip-flops of said second electric means to discharge the last said integrating means at the same time the flip-flops are reset to their initial condition.

References Cited in the file of this patent

UNITED STATES PATENTS

| | | |
|---|---|---|
| 2,105,247 | Jakosky | Jan. 11, 1938 |
| 2,539,270 | Puranen et al. | Jan. 23, 1951 |
| 2,598,697 | Jensen | June 3, 1952 |
| 2,598,698 | Jensen | June 3, 1952 |
| 2,611,802 | Jensen | Sept. 23, 1952 |
| 2,635,134 | Jenny | Apr. 14, 1953 |
| 2,774,056 | Stafford et al. | Dec. 11, 1956 |
| 2,779,872 | Patterson | Jan. 29, 1957 |
| 2,779,914 | Rumbaugh et al. | Jan. 29, 1957 |
| 2,794,965 | Yost | June 4, 1957 |
| 2,891,215 | Fearon | June 16, 1959 |
| 2,916,724 | Peterson | Dec. 8, 1959 |
| 2,956,261 | Grossling | Oct. 11, 1960 |

OTHER REFERENCES

"Airborne Equipment for Geomagnetic Measurements," by C. H. Rumbaugh and L. R. Alledredge, Transactions, American Geophysical Union, vol. 30, No. 6, December 1949, pp. 836–848.

"The Gulf Airborne Magnetic Gradiometer," by W. E. Wickerham, Geophysics, January 1954, pp. 116–123.